(12) United States Patent
Mannerfelt et al.

(10) Patent No.: US 8,453,591 B2
(45) Date of Patent: Jun. 4, 2013

(54) MARINE VESSEL WITH EXTENDABLE AND RETRACTABLE SURFACE EFFECT WINGS

(76) Inventors: Ocke Mannerfelt, Täby (SE); Rex Jardine, Kelowna (CA)

( * ) Notice: Subject to any disclaimer, the term of this patent is extended or adjusted under 35 U.S.C. 154(b) by 561 days.

(21) Appl. No.: 12/462,762

(22) Filed: Aug. 10, 2009

(65) Prior Publication Data
US 2011/0030607 A1    Feb. 10, 2011

(51) Int. Cl.
| B63B 1/16 | (2006.01) |
| B63B 1/32 | (2006.01) |
| B60V 1/00 | (2006.01) |
| B60V 3/00 | (2006.01) |
| B60V 3/06 | (2006.01) |

(52) U.S. Cl.
USPC .................. 114/272; 114/273; 180/116

(58) Field of Classification Search
USPC ............. 114/67 A, 126, 271–273, 282, 284; 180/116–122; 244/45 R–45 A
See application file for complete search history.

(56) References Cited

U.S. PATENT DOCUMENTS

| 2,444,332 A * | 6/1948 | Briggs et al. ................. 244/49 |
| 2,448,075 A * | 8/1948 | Bortner ..................... 244/102 R |
| 3,302,602 A * | 2/1967 | Korganoff ................... 114/313 |
| 3,322,223 A * | 5/1967 | Bertelsen ..................... 180/120 |
| 4,666,012 A * | 5/1987 | Howell et al. ................ 180/117 |
| 5,105,898 A * | 4/1992 | Bixel, Jr. ...................... 180/117 |
| 5,404,830 A * | 4/1995 | Ligozio ....................... 114/282 |
| 5,582,123 A * | 12/1996 | Rethorst ....................... 114/62 |
| 5,934,215 A * | 8/1999 | Burg ........................ 114/67 A |
| 6,990,918 B2 * | 1/2006 | Markie ....................... 114/273 |

* cited by examiner

Primary Examiner — Ajay Vasudeva

(57) ABSTRACT

A mono boat hull power boat with extendable and retractable surface effects wings. The boat hull has wing cavities housing the wings inside the hull. At the front of wing cavity wing pivots are located, and at the rear of the wing cavities extending mechanisms are located, allowing for the pivotal extension and retraction of the wings in to the hull cavities.

4 Claims, 5 Drawing Sheets

MARINE VESSEL WITH EXTENDABLE AND RETRACTABLE SURFACE EFFECT WINGS

TECHNICAL FIELD

The invention relates to a power boat with extendable or projectable, and retractable surface effects wings and more specifically to a marine vessel that can achieve surface affects by extending a pair of wings, where the wings can be retracted when not needed such as when docking and for transportation.

BACKGROUND OF THE INVENTION

A power boat with surface or ground effects is well known and often consists of fixed wings in-between two catamaran hulls, or from a mono hull out towards two outboard pontoons. As well the wings can be cantilevered from a mono hull such as U.S. Pats. D359,941 D374,852 D379,451.

These mono hull designs are very effective, but the wings which protrude from the hull can be in the way for certain operations such as when docking, especially with a boat that is of larger size.

Other examples of mono hull ground effect boats are U.S. Pat. Nos. 3,481,297 and 4,080,922. Both these examples use wings that are rotated down or up on horizontal hinges.

Accordingly, it is an object of the present invention to provide a surface effect winged mono hull where the wings can be easily and quickly extended for use and retracted inwards for docking and transporting.

Another object of the present invention is to improve on fuel economy on a narrow mono hull configuration as the boat hull is raised up in the water upon extension of the wings.

Yet another object of the present invention is to improve stability at higher speeds.

Still another object of the present invention is to provide a simple method of mechanically extension and retraction of the wings.

Yet another object of the present invention is to reduce roll and pitch motion of the boat giving a softer smother ride in rougher water.

The power boat with extendable and retractable surface effect wings of the present invention has other objects and features of advantage which will become apparent from and are set forth in more detail in, the accompanying drawings and following details.

DISCLOSURE OF THE INVENTION

The present invention provides an apparatus to deploy and retract surface effect wings while the vessel is stationary or in motion.

The surface effect wings are mounted within port and starboard cavities so that the wings can be extended during normal operation or retracted for docking or transportation. The wings are normally pivoted at the front of the cavities and are extended near the rear of the cavities either hydraulically or mechanically. If a hydraulic system is used there are two way hydraulic cylinders that are powered by a hydraulic pump. If the wings are extended mechanically the use of electric motors powering screws such as a pair of ballscrews or leadscrews having a lead nut in each wing can be used.

The wings can be pivoted at the front when they are extended and retracted on hinges, or by a ball and socket type of pivot as may be considered as a practical manufacturing process.

Other methods could be used to extend and retract the wings if desired such as a rack and pinion or even manually positioning of the wings could be used.

The cavity that the wings retract into are normally a closed cavity where the cavities have a bottom a top and a back side so to prevent water from entering by splashing past the wings an then entering the inside of the hull. The wings may also have a seal where desired.

The cavity could also be situated along the center portion of the hull and may be mounted either near or just above the waterline, or well above the waterline depending on the style, shape and center of gravity of the boat that they are mounted on. The waterline is associated with the boats draw i.e. the manufacture weight and the maximum loaded weight, establishing a "waterline".

The wing cavities and wings have guides that guide the wing as they are extended out and retracted in. These guides may be made of or coated with Teflon, which would be attached to either the cavity outer lip or to both the wings and the cavities.

The surface effect from the underside of the wings to the water will stabilize the boat in roll plane and the moment of inertia will be higher. With the wings folded out the static moment of inertia will be higher due to the weight of the wings as they are further out from the center of gravity of the boat.

When the wings are out the surface effect under the wings will help to stabilize the boat by reducing the roll and pitch motion of the boat. The wing itself has a small camber and a small angle of attack in the appropriate areas to give a small lifting force around the centre of gravity of the boat.

The extension of the wings while under top speed can be set to maximum out, halfway out and full in to optimize the ride effect depending on the water and wind conditions. With the wings extended out the transverse stability is raised substantially, achieving a higher GZ stability curve.

In an alternate embodiment of the present invention the surface effect wings can be rotated out of and rotated back into the cavities on cam followers following a curved track. This method can reduce the cavity required around the rear cockpit area allowing more usable room inside the cockpit area. Again here the method of activation would include electric over mechanical and hydraulic over mechanical, or as may be desired.

BRIEF DESCRIPTION OF THE DRAWINGS

Advantages of the present invention will become more fully appreciated as the same becomes better understood when considered in conjunction with the following detailed description of an illustrative embodiment and accompanying drawings, in which like reference characters designate the same or similar parts throughout the several views, and wherein.

DETAILED DESCRIPTION OF THE PREFERRED EMBODIMENTS

Figure 1:
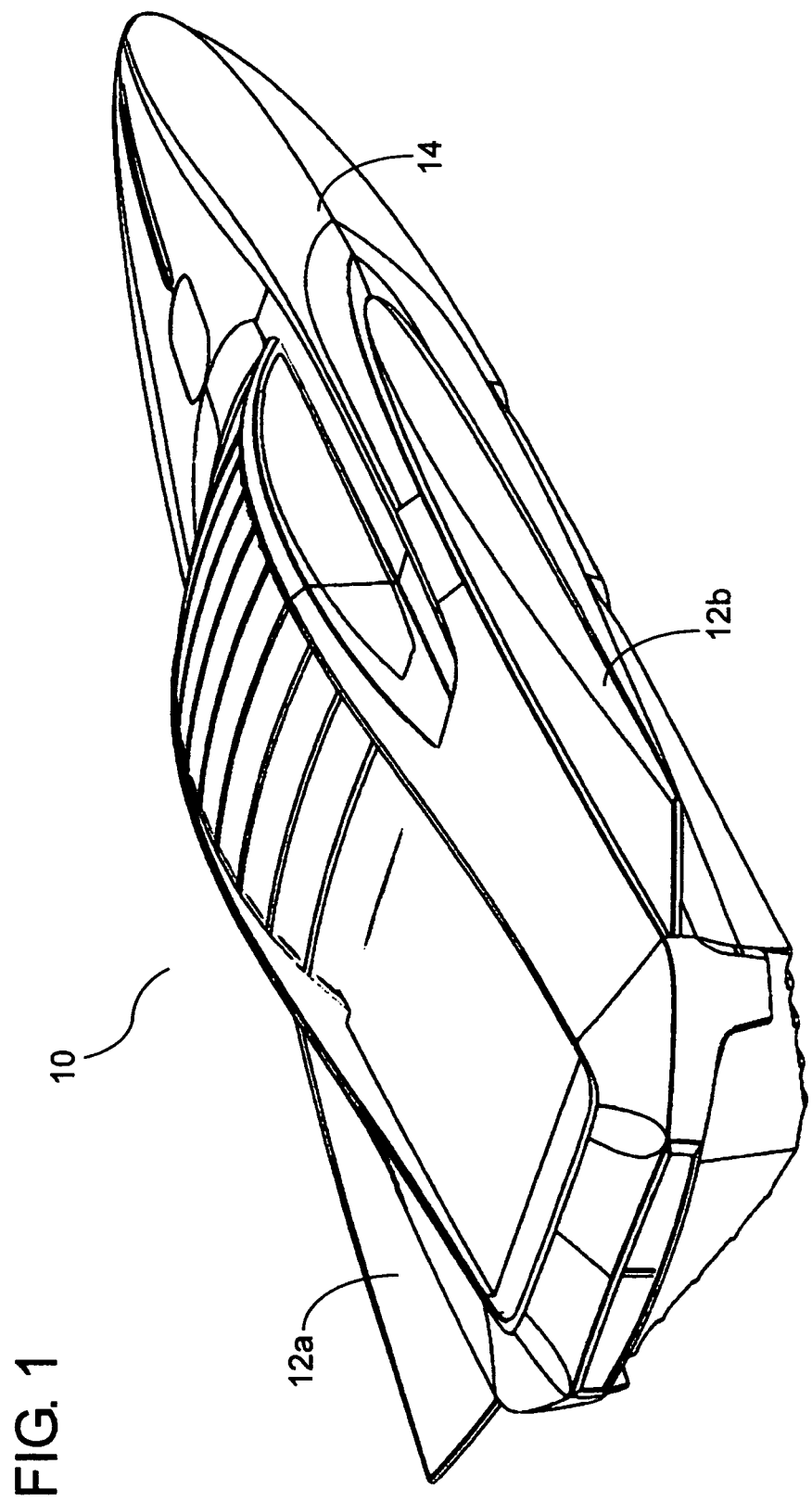
FIG. 1 is a perspective starboard view of the preferred embodiment showing the invention with the wings extended.

The power boat with extendable and retractable surface effects wings is generally referred to as 10 as shown in a perspective starboard view in FIG. 1. A pair of power boat wings 12*a* and 12*b* are shown extended from hull 14.

Figure 2:
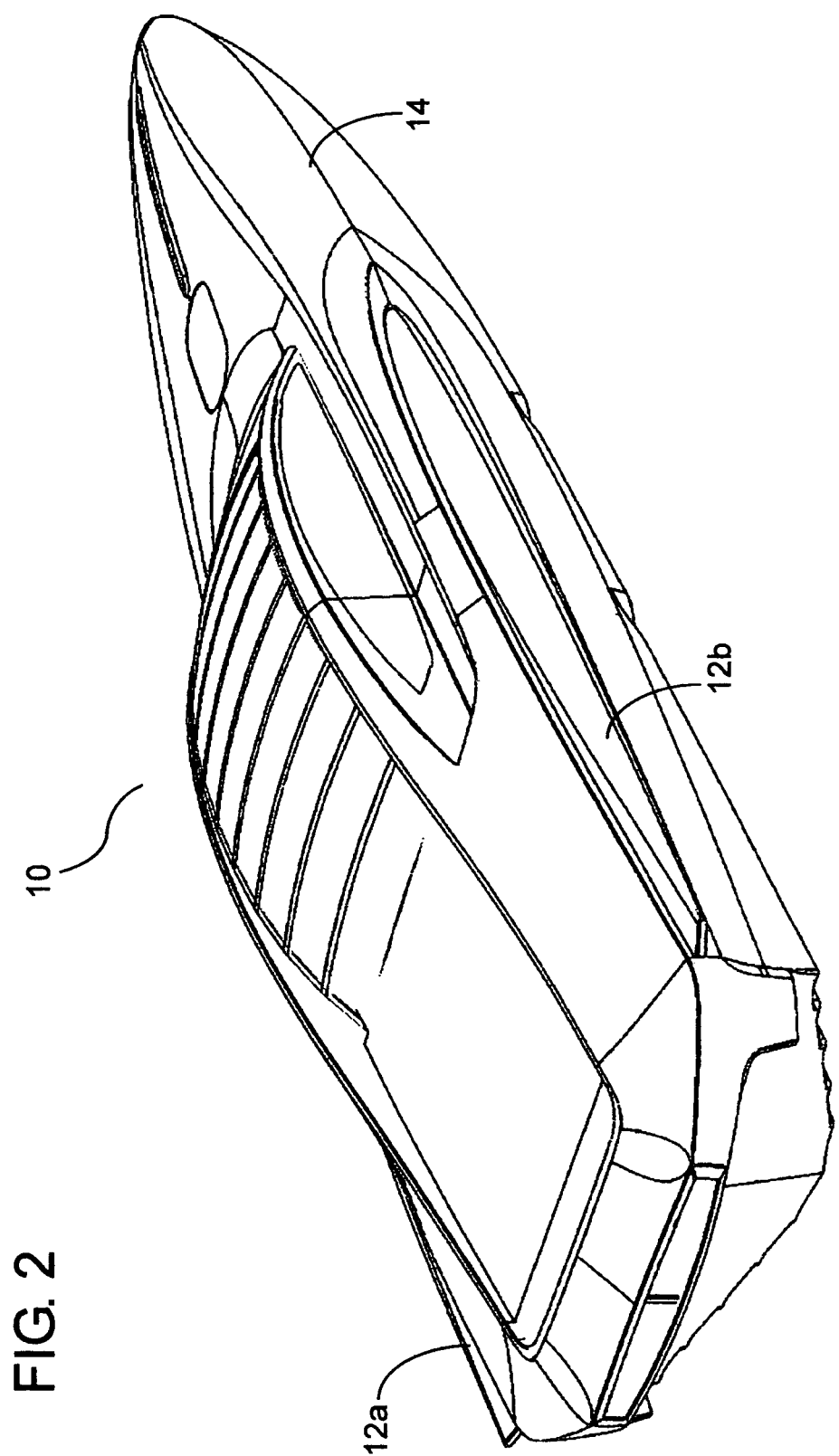
FIG. 2 is a perspective starboard view of the preferred embodiment showing the invention with the wings retracted.

In a similar view FIG. 2 shows wings 12*a* and 12*b* retracted into hull 14. In this starboard view, wing 12*b* can be seen retracted into wing cavity 16 within hull 14.

Figure 3:
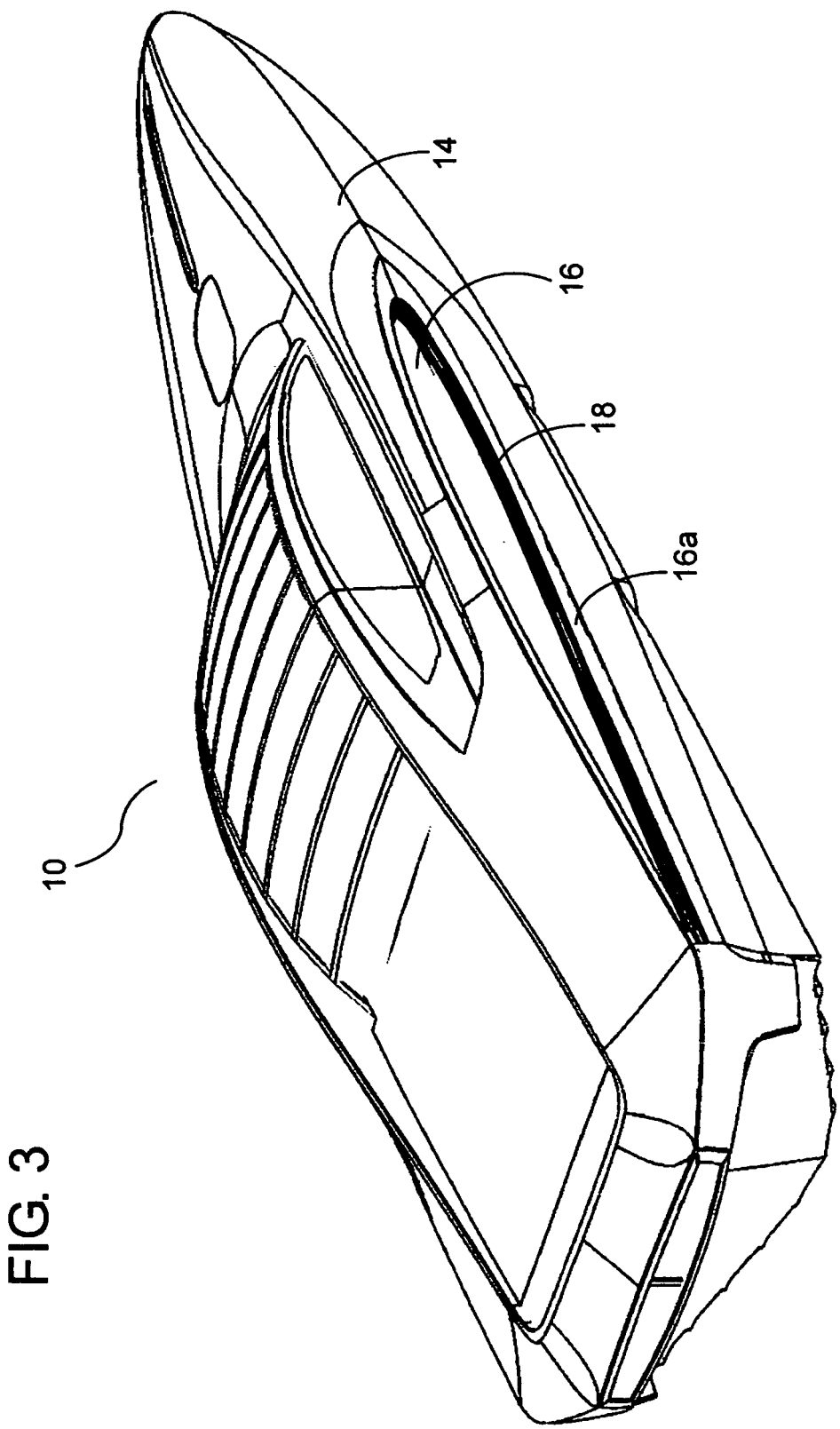
FIG. 3 is a perspective starboard view of the preferred embodiment showing the invention with the wings removed from the hull.

FIG. 3 is a similar perspective starboard view of the invention showing the wings removed from hull 14. Here guide 18 can be seen attached to outer lip 16*a* of wing cavity 16. Guide 18 consist of a mating surface to wing 12*b* where the wing glides over guide 18. Guide 18 has a Teflon coating to allow smooth extension and retraction of the wings in all weather.

Hull 14 is symmetric so only starboard views are used for simplicity purposes.

Figure 4:
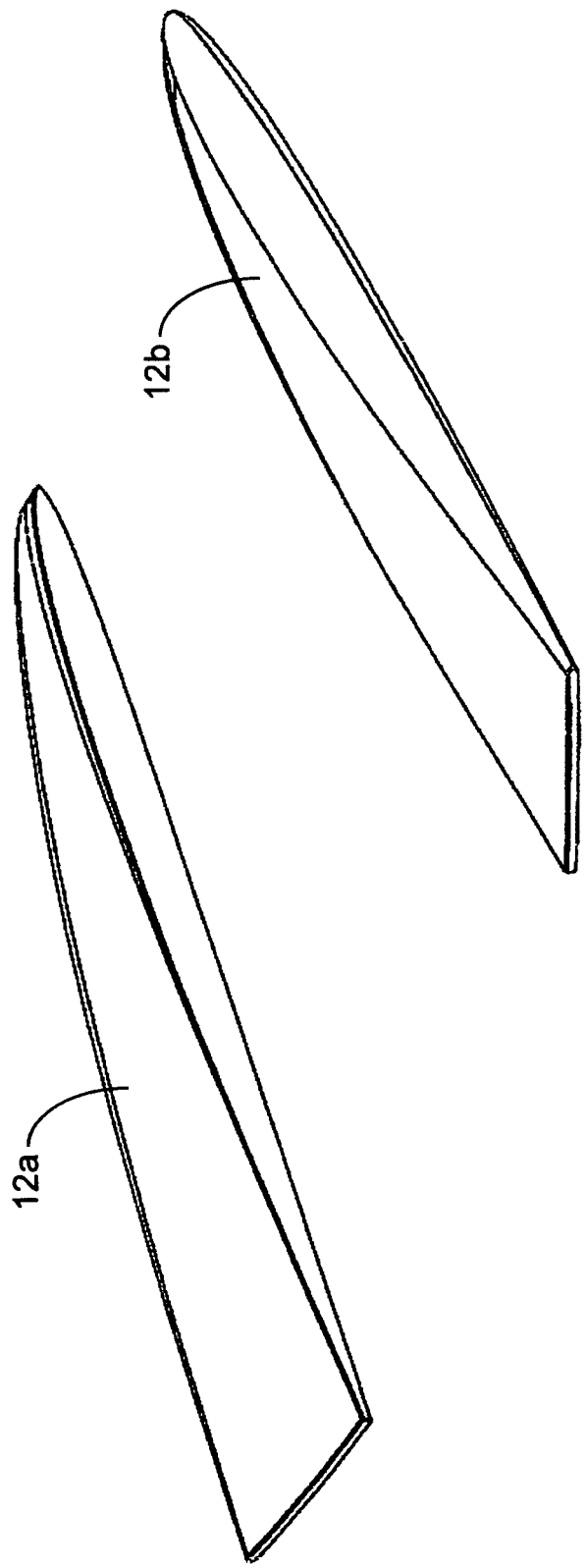
FIG. 4 is a perspective view showing the wings only.

FIG. 4 is a perspective view showing wings 12*a* and 12*b* separated from hull 14.

Figure 5:
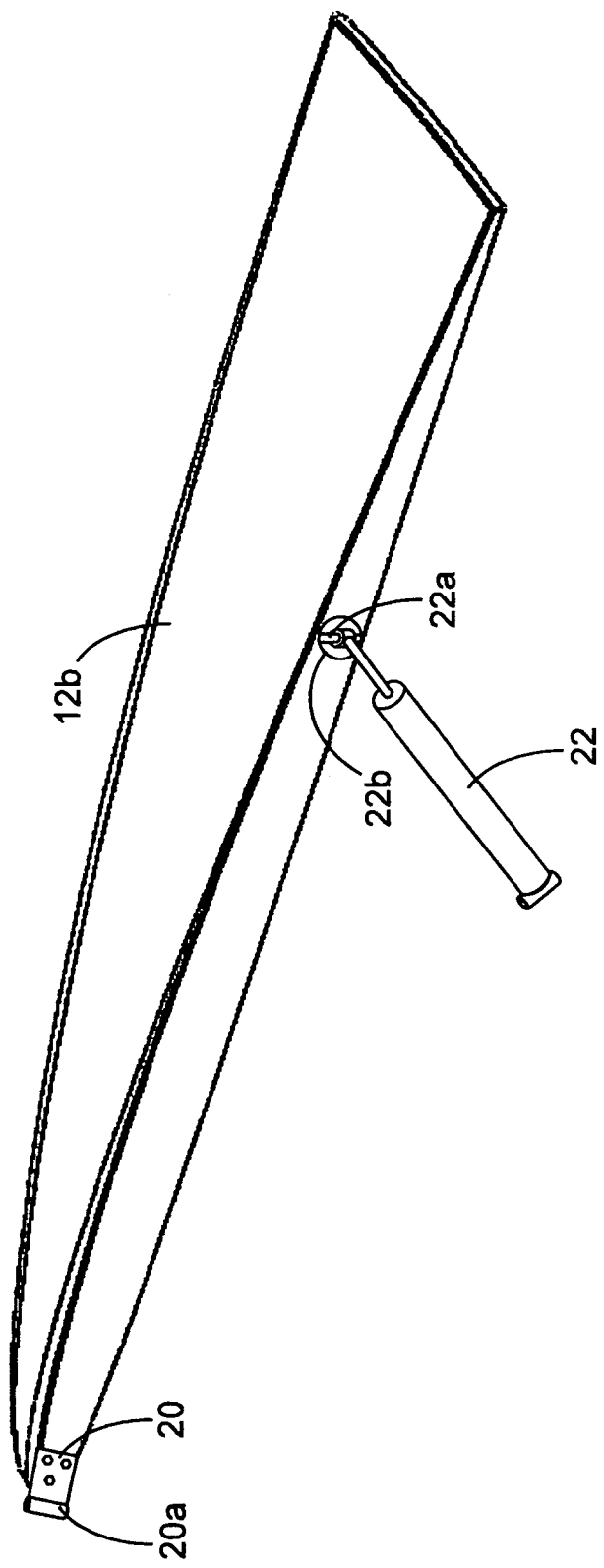
FIG. 5 is a perspective view showing the wings with hinge plate and hydraulic cylinder attached.

FIG. 5 is a perspective view showing starboard wing 12*b* with hinge 20, hinge barrel 20*a* and hydraulic cylinder 22 attached to wing 12*b* by pin 22*a* within cylinder attachment hole 22*b*.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

It is intended that the scope of the invention be defined by the Claims appended hereto and their equivalents.

What is claimed is:

1. A power boat with extendable and retractable surface effects wings, comprising:

a mono boat hull having a bow, a stern, a port side and a starboard side;

said mono boat hull having a port wing cavity and a starboard wing cavity positioned above a waterline of said boat hull and substantially towards said stern of said boat hull;

said port wing cavity and said starboard wing cavity each having a front area and a rear area where said rear areas are near said stern;

said port wing cavity and said starboard wing cavity each having a top roof, three side walls and a floor to accept a port wing and a starboard wing therein; where each said cavity is closed to prevent water entering inside of said hull;

said port wing cavity and said starboard wing cavity each having a pivot located said front area of said port wing cavity and said front area of said starboard wing cavity;

said port wing cavity and said starboard wing cavity each having a wing extending enabling mechanism mounted said rear area of said port wing cavity and said rear area of said starboard wing cavity;

said port and said starboard wings pivot on said port and said starboard pivots; and where said port wing and said starboard wing are extendable and retractable by said port and said starboard wing extending enabling mechanism.

2. The power boat with extendable and retractable surface effects wings of claim 1, where said port cavity and said starboard cavity are substantially away from said stern.

3. The power boat with extendable and retractable surface effects wings of claim 1, where said wings have guides and said cavities have guides that correlate with said wing guides.

4. The power boat with extendable and retractable surface effects wings of claim 3, where said guides are Teflon surfaced.

* * * * *